United States Patent
Martyka et al.

(10) Patent No.: US 6,773,370 B2
(45) Date of Patent: Aug. 10, 2004

(54) SEVEN-SPEED PLANETARY TRANSMISSION

(75) Inventors: Patrick J. Martyka, South Lyon, MI (US); Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/319,950

(22) Filed: Dec. 16, 2002

(65) Prior Publication Data

US 2004/0116237 A1 Jun. 17, 2004

(51) Int. Cl.[7] ................................................. F16H 3/66
(52) U.S. Cl. ...................................... 475/275; 475/278
(58) Field of Search ................................ 475/278, 275, 475/277, 288, 289

(56) References Cited

U.S. PATENT DOCUMENTS 6,217,474 B1 * 4/2001 Ross et al. .................. 475/269
6,689,010 B2 * 2/2004 Usoro et al. ................. 475/296
6,709,358 B2 * 3/2004 Raghavan et al. ........... 475/275
6,716,130 B1 * 4/2004 Bucknor et al. ............. 475/275
2003/0083173 A1 * 5/2003 Miyazaki et al. ............ 475/280
2004/0023745 A1 * 2/2004 Raghavan et al. ........... 475/276

FOREIGN PATENT DOCUMENTS

JP         2000-266138 A  *  9/2000

* cited by examiner

Primary Examiner—Ankur Parekh
(74) Attorney, Agent, or Firm—Leslie C. Hodges

(57) ABSTRACT

A seven-speed planetary transmission incorporates three planetary gearsets and six torque-transmitting mechanisms. Each of the planetary gearsets is a simple type planetary gearset, three of the torque-transmitting mechanisms are rotating type torque-transmitting mechanisms commonly termed clutches, and three of the torque-transmitting mechanisms are stationary type torque-transmitting mechanisms commonly termed brakes. A one-way torque-transmitting mechanism is included to simplify the engagement of the first of the forward speed ratios as well as to simplify the ratio interchange between the first and second of the speed ratios.

4 Claims, 1 Drawing Sheet

| GEAR RATIO | NUMERICAL VALUE | TORQUE TRANSMITTING MECHANISM ENGAGEMENT | | | | | | |
|---|---|---|---|---|---|---|---|---|
| | | 44 | 40 | 38 | 34 | 36 | 32 | 42 |
| REV | 3.00 | | | | G | | | X |
| N | | | | | | | | |
| 1ST | 5.333 | X | | | | | G | C |
| 2ND | 3.083 | | X | | | | X | |
| 3RD | 2.333 | | | X | | | X | |
| 4TH | 1.762 | | | | X | | X | |
| 5TH | 1.333 | | | | | X | X | |
| 6TH | 1.000 | | | | X | X | | |
| 7TH | 0.75 | | | X | | X | | |

G = GARAGE SHIFT
C = COAST
X = ENGAGED

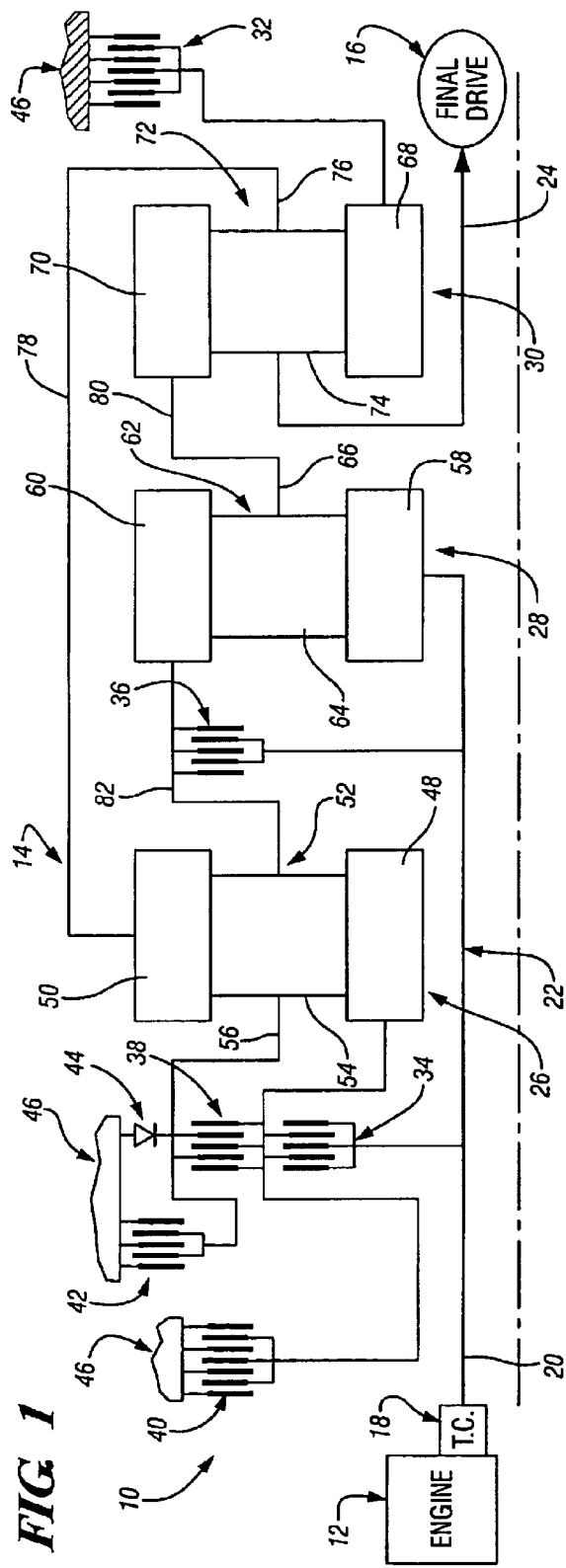

US 6,773,370 B2

SEVEN-SPEED PLANETARY TRANSMISSION

TECHNICAL FIELD

This invention relates to power transmissions and, more particularly, to multi-speed power transmissions employing planetary gearsets.

BACKGROUND OF THE INVENTION

Planetary gearsets for automatic shifting power transmissions have been used in passenger vehicles and trucks for many years. The transmissions in the automatic phase progressed from two-speed transmissions to six-speed transmissions, which are currently used in some present day automobiles.

These inventions often incorporate a plurality of planetary gearsets, which are controlled by a number of torque-transmitting mechanisms known as clutches and brakes. The clutches and brakes are selectively engaged to establish the speed ratios desired through the planetary gearsets. Many of the proposed five- and six-speed planetary transmissions for use in today's vehicles incorporate three planetary gearsets to provide those forward speed ratios. It has also been proposed to provide seven forward speed ratios in planetary transmissions, and in some instances, more than seven speeds.

SUMMARY OF THE INVENTION

It is an object of the present invention to provide an improved power transmission providing seven forward speed ratios and one reverse speed ratio.

In one aspect of the present invention, the transmission incorporates three simple planetary gearsets each having a sun gear member, a ring gear member, and a planet carrier assembly member.

In another aspect of the present invention, six torque-transmitting mechanisms are incorporated to establish seven forward speed ratios and one reverse speed ratio in the planetary gearsets.

In still another aspect of the present invention, one of the torque-transmitting mechanisms has placed in parallel therewith a one-way torque-transmitting device.

In yet still another aspect of the present invention, each of the planetary gearsets has one member connected to another of the planetary gearsets.

In a further aspect of the present invention, a member of one of the planetary gearsets is continuously connected to a transmission input shaft, which is continuously driven by an engine and input device such as a torque converter.

DESCRIPTION OF THE DRAWINGS

FIG. 1 is a schematic representation of a powertrain incorporating the present invention.

FIG. 2 is a chart providing torque-transmitting mechanism engagement relationships as well as speed ratio relationships for the power transmission shown in the powertrain of FIG. 1.

DESCRIPTION OF AN EXEMPLARY EMBODIMENT

Referring to the drawings, wherein like characters represent the same or corresponding parts throughout the several views, there is seen in FIG. 1 a powertrain 10 having an engine 12, a planetary transmission 14, and a conventional final drive mechanism 16. The engine 12 has associated therewith a conventional torque converter or hydrodynamic fluid drive mechanism 18. The engine 12 is a conventional prime mover, such as an internal combustion unit. The final drive mechanism 16 is a conventional output drive mechanism, such as a differential gearing assembly.

The planetary transmission 14 includes an input shaft 20 continuously connected with the torque converter 18, a planetary gear arrangement 22, and an output shaft 24. The planetary gear arrangement 22 includes three planetary gearsets 26, 28, and 30, and six selectively engageable torque-transmitting mechanisms 32, 34, 36, 38, 40, and 42, and a conventional one-way torque-transmitting mechanism 44.

The torque-transmitting mechanisms 32, 40, and 42 are conventional stationary type torque-transmitting mechanisms, commonly termed brakes. As is well known, these devices are fluid-operated friction mechanisms generally incorporating either a plurality of friction plates or a band. At least one portion of the stationary torque-transmitting mechanisms 32, 40, and 42 are connected to a stationary transmission housing 46.

The torque-transmitting mechanisms 34, 36, and 38 are conventional rotating type torque-transmitting mechanisms, commonly termed clutches. These devices are also well known in the art and employ a hydraulically actuated apply piston and a plurality of interdigitated friction discs which permit connection between two rotating members of the transmission.

The planetary gearset 26 includes a sun gear member 48, a ring gear member 50, and a planet carrier assembly member 52. The planet carrier assembly member 52 includes a plurality of pinion gear members 54 that are rotatably mounted on a planet carrier member 56 and disposed in meshing relationship with both the sun gear member 48 and the ring-gear member 50. The planetary gearset 26 is commonly termed a "simple" planetary gearset.

The planetary gearset 28, which is also a simple planetary gearset, includes a sun gear member 58, a ring gear member 60, and a planet carrier assembly member 62. The planet carrier assembly member 62 includes a plurality of pinion gear members 64 rotatably mounted on a planet carrier member 66 and disposed in meshing relationship with both the sun gear member 58 and the ring gear member 60.

The planetary gearset 30 is also a simple planetary gearset and includes a sun gear member 68, a ring gear member 70, and a planet carrier assembly member 72. The planet carrier assembly member 72 includes a plurality of pinion gear members 74 rotatably mounted on a planet carrier member 76 and disposed in meshing relationship with both the sun gear member 68 and the ring gear member 70.

The planetary gear arrangement 22 has three interconnecting members 78, 80 and 82. The interconnecting member 78 continuously connects the ring gear member 50 with the planet carrier member 76, which in turn is continuously connected with the output shaft 24. The interconnecting member 80 provides continuous interconnection between the planet carrier member 66 and the ring gear member 70. The interconnecting member 82 provides continuous driving connection between the planet carrier member 56 and the ring gear member 60. The interconnecting member 82 is also operatively connected with the torque-transmitting mechanism 38, the torque-transmitting mechanism 42, and the one-way torque-transmitting mechanism 44.

The sun gear member 48 is operatively connected with the torque-transmitting mechanism 34, the torque-transmitting mechanism 38, and the torque-transmitting mechanism 40. The input shaft 20 is operatively connected through the torque-transmitting mechanism 34 with the sun gear member 48, and through the torque-transmitting mechanism 36 with the interconnecting member 82. The torque-transmitting mechanism 32 is selectively operable to interconnect the sun gear member 68 with transmission housing 46.

The torque-transmitting mechanisms 32, 34, 36, 38, 40, and 42 are selectively engageable to establish a reverse speed ratio and seven forward speed ratios between the input shaft 20 and the output shaft 24 through the planetary gear arrangement 22.

The reverse speed ratio is established with the engagement of the torque-transmitting mechanisms 34 and 42. During the reverse speed ratio, the torque-transmitting mechanism 42 is fully engaged while the torque-transmitting mechanism 34 is engaged in a controlled manner to establish the drive ratio smoothly through the transmission. Thus, in the chart of FIG. 2, the torque-transmitting mechanism 42 is described as an "X" in the reverse ratio while the torque-transmitting mechanism 34 is described as a "G". The "G" indicates that it is a garage shift mechanism employed in launching the vehicle.

The first forward speed ratio is established with the engagement of the torque-transmitting mechanism 32 in a controlled manner. The reaction for the first forward speed ratio can be obtained with the one-way torque-transmitting mechanism 44 or with the engagement of the torque-transmitting mechanism 42, which is described as a "C" condition in the chart of FIG. 2. The "C" indicates that the torque-transmitting mechanism 42 is engaged to provide an engine coast condition, however, it can also be employed in normal drive conditions in the first forward speed ratio. Note that the torque-transmitting mechanism 42 can remain engaged during the reverse-to-forward interchange.

During the second forward speed ratio, the torque-transmitting mechanism 32 remains engaged while the torque-transmitting mechanism 40 is engaged. The engagement of the torque-transmitting mechanism 40 causes a rotation of the planet carrier member 56 to reverse thereby relieving the one-way torque-transmitting mechanism 44 of any reaction duties. If the torque-transmitting mechanism 42 is on during a 1–2 interchange, the torque-transmitting mechanism 42 is simultaneously disengaged while the torque-transmitting mechanism 40 is engaged.

The third forward speed ratio is established by retaining the engagement of the torque-transmitting mechanism 32 while swapping engagements between the torque-transmitting mechanisms 38 and 40.

The fourth forward speed ratio is established by maintaining the torque-transmitting mechanism 32 engaged while swapping engagements of the torque-transmitting mechanisms 34 and 38.

The fifth forward speed ratio is established by retaining the torque-transmitting mechanism 32 engaged while swapping engagements of the torque-transmitting mechanisms 36 and 34.

The sixth forward speed ratio is established by retaining the engagement of the torque-transmitting mechanism 36 while swapping engagements of the torque-transmitting mechanisms 32 and 34.

The seventh forward speed ratio is established by retaining the torque-transmitting mechanism 36 engaged while the torque-transmitting mechanisms 34 and 40 are swapped.

It is easily noticed from the chart in FIG. 2 that the forward ratio interchanges are all of the single transition variety. That is, one torque-transmitting mechanism remains engaged through the shift sequence while one torque-transmitting mechanism is exchanged. Thus, it is well known that the transmission retains torque control over the vehicle during the interchanges.

The reverse speed ratio is established by the planetary gearset 26. The first forward speed ratio is established by the planetary gearsets 28 and 30. The second forward speed ratio is established by all three planetary gearsets 26, 28, and 30. The third forward speed ratio is established by the planetary gearsets 28 and 30. The fourth forward speed ratio is established by all three planetary gearsets 26, 28, and 30. The fifth forward speed ratio is established by the planetary gearsets 28 and 30. The sixth forward speed ratio is a 1:1 ratio wherein the torque is transmitted through the planetary gearset 26. The seventh forward speed ratio is an overdrive ratio established by the planetary gearset 26.

Thus, the planetary gearset 26 is operative in the reverse speed ratio and four forward speed ratios. The planetary gearsets 28 and 30 are operative in five forward speed ratios. It can be noted from the chart of FIG. 2 that the torque-transmitting mechanism 32 is engaged for five of the forward speed ratios and the torque-transmitting mechanism 36 is engaged for three of these torque-transmitting mechanisms. The overlapping engagement of torque-transmitting mechanisms 32 and 36 occurs in the fifth forward speed ratio.

The first through fifth forward speed ratios are underdrive ratios, that is, the input shaft 20 rotates more rapidly than the output shaft 24. During the sixth forward speed ratio, the input shaft 20 and output shaft 24 rotate in unison. During the seventh forward speed ratio, the output shaft 24 rotates more rapidly than the input shaft 20 indicating an overdrive ratio.

The chart of FIG. 2 provides an example of numerical values for ratios that are available with the planetary gear arrangement 22. These ratio numbers are established with the ring gear/sun gear tooth ratios of each of the planetary gearsets being equal to 3.00.

Obviously, there are modifications and variations that will become apparent to those skilled in the art upon reviewing the above specification. Therefore, the invention is intended to be limited only by the scope of the appended claims.

What is claimed is:

1. A seven forward speed planetary transmission comprising:

an input shaft;

an output shaft;

a housing;

a first planetary gearset having a first member, a second member, and a third member, said first member being continuously connected with said output shaft;

a second planetary gearset having a first member, a second member, and a third member, said first member being continuously connected with said input shaft, said third member being continuously connected with said third member of said first planetary gearset;

a third planetary gearset having a first member, a second member, and a third member, said first member being continuously interconnected with said output shaft, said second member being continuously interconnected with said second member of said second planetary gearset;

a first torque-transmitting mechanism selectively connectible between said third member of said third planetary gearset and said housing;

a second torque-transmitting mechanism selectively connectible between said second member of said first planetary gearset and said input shaft;

a third torque-transmitting mechanism selectively connectible between said input shaft and both said third member of said first planetary gearset and said third member of said second planetary gearset;

a fourth torque-transmitting mechanism selectively connectible between said second member of said first planetary gearset and said third member of said first planetary gearset;

a fifth torque-transmitting mechanism selectively connectible between said second member of said first planetary gearset and said housing;

a sixth torque-transmitting mechanism selectively connectible between said housing and both said third member of said first planetary gearset and said third member of said second planetary gearset; and said sixth torque-transmitting mechanisms being selectively engaged in combinations of at the most two torque-transmitting mechanisms to establish seven forward speed ratios between said input shaft and said output shaft.

2. The seven forward speed planetary transmission defined in claim 1 further wherein a one-way torque-transmitting mechanism is operable between said third member of said first planetary gearset and said housing and cooperates with said first torque-transmitting mechanism to establish a first forward speed ratio within the transmission.

3. The seven forward speed planetary transmission defined in claim 1 further wherein said first torque-transmitting mechanism is selectively engaged during the establishment of five of the forward speed ratios and said third torque-transmitting mechanism is selectively engaged during three forward speed ratios, only one of which overlaps the speed ratios established by the first torque-transmitting mechanism.

4. The seven forward speed planetary transmission defined in claim 1 further wherein:

said first member of said first planetary gearset, said third member of said second planetary gearset, and said second member of said third planetary gearset each being ring gear members;

said second member of said first planetary gearset, said first member of said second planetary gearset, and said third member of said third planetary gearset each being sun gear members; and said third member of said first planetary gearset, said second member of said second planetary gearset, and said first member of said third planetary gearset each being a planet carrier member.

* * * * *